Dec. 1, 1942.   B. LONG   2,303,749
PROCESS AND APPARATUS FOR TEMPERING GLASS SHEETS
Filed April 2, 1936   6 Sheets-Sheet 1

Inventor
BERNARD LONG
By
Attorneys

Dec. 1, 1942.                B. LONG                2,303,749
        PROCESS AND APPARATUS FOR TEMPERING GLASS SHEETS
                Filed April 2, 1936      6 Sheets-Sheet 2

Inventor
BERNARD LONG
By
Attorneys

Dec. 1, 1942.                    B. LONG                    2,303,749
           PROCESS AND APPARATUS FOR TEMPERING GLASS SHEETS
                Filed April 2, 1936            6 Sheets-Sheet 3

Inventor
BERNARD LONG

By
Attorneys

Dec. 1, 1942.         B. LONG         2,303,749
PROCESS AND APPARATUS FOR TEMPERING GLASS SHEETS
Filed April 2, 1936         6 Sheets-Sheet 4

Inventor
BERNARD LONG
By Dorsey Cole
Attorneys

Dec. 1, 1942.  B. LONG  2,303,749
PROCESS AND APPARATUS FOR TEMPERING GLASS SHEETS
Filed April 2, 1936  6 Sheets-Sheet 5

Inventor
BERNARD LONG
By Horsey Cole
Attorneys

Patented Dec. 1, 1942

2,303,749

UNITED STATES PATENT OFFICE 2,303,749

PROCESS AND APPARATUS FOR TEMPERING GLASS SHEETS

Bernard Long, Paris, France, assignor to The American Securit Company, Wilmington, Del., a corporation of Delaware Application April 2, 1936, Serial No. 72,411
In France April 6, 1935

22 Claims. (Cl. 49—45)

In the processes now employed for the tempering of sheets of glass where the cooling is effected by means of a blowing of air or a cooling fluid, the products obtained present defects or visible iridescent spots when the sheets are examined under an oblique incidence, and which, although slight, still are detrimental to the appearance and the commercial value of these sheets. These iridescent spots correspond to the variable effects of the birefringence of glass and are due to the insufficiently regular cooling of the surface of the glass by the blowing members.

The means put into practice up to now in order to attenuate these iridescent spots have consisted in rapidly displacing upon the surface of the glass the zones of impact of the jets of air issuing from several orifices. But the methods which have been used for this purpose have not given completely satisfactory results and iridescent spots are still found upon the tempered products, which are due to variations in the cooling action between certain zones and the adjacent zones and which correspond either to the form of the orifices or to the trajectory which has been imparted to the latter.

The present invention has for its aim the remedying of these objections in an absolutely complete manner.

It consists in effecting the cooling of the sheet by displacement of a cooling fluid in contact therewith, in particular, air, this displacement involving among others the following characteristics:

(a) The cooling fluid is projected, by blowing or by suction, through one or several slits, in the form of continuous strips or sheets which in their way in contact with the glass sheet present no sudden variation, either in their section or in their outline, and which extend beyond both sides of the sheet.

(b) The strips or sheets are constantly in movement in relation to the glass sheet, and this movement is carried out in such a manner that each cooling strip or sheet is first entirely beyond the glass sheet, afterwards comes in contact therewith, then passes over it in a continuous manner while sweeping the whole surface of the glass sheet, and finally finds itself entirely beyond it.

Experience has shown that the sheets of tempered glass obtained by this process of cooling do not present any birefringent defects, whatever the incidence under which they are observed. Moreover, it has been established that it is sufficient to effect the beginning of the cooling of the sheet of glass by this process and that it is possible to stop after the passage of a certain number of the strips or sheets of air and to finish by the aid of known means, such as, for example, a simple blowing by grilles or plates provided with stationary openings.

Several modes of realizing the invention are described hereinafter as exemplary.

In these different modes of execution, the blowing orifices are rectilinear slits parallel to the sheet and in all of the positions at which they act upon the sheet, they extend beyond the limits thereof.

In a first mode, the sheet is stationary; the blowing members are carried by a carriage which moves in parallel to the sheet, and which is actuated by an alternating to-and-fro rectilinear movement.

In a second mode the sheet is likewise stationary and the cooling slots move again in a rectilinear manner, but this movement in the portion where the members operate upon the sheet takes place constantly in the same direction.

In a third mode, the sheet again remaining stationary, the blowing members are actuated in a circular movement around an axis which is perpendicular to the plane of the sheet and situated outside the outline thereof, this movement possibly being either a to-and-fro movement of a movement of continuous rotation.

Another mode of realizing the invention consists in leaving the cooling slits stationary and in displacing the sheet. In particular, it is possible to reproduce in this way the same relative movements of the slits in relation to the sheet as in the modes of execution indicated above.

The different characteristics of the process and those which are peculiar to each of the several modes of realization indicated above will appear more clearly in the course of the following description relating to these modes of realization and in reference to the accompanying drawings given as examples only, in which:

In the different figures the same numerals refer to the same elements.

In accordance with the invention, the tempering of a sheet of glass 1 (Fig. 1) is effected by the aid of strips or sheets 2 of air or other fluid.

Figure 1:
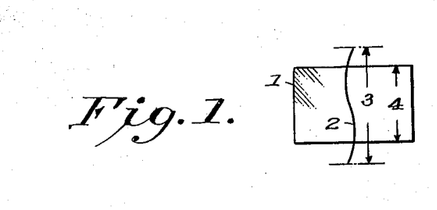
Figs. 1 and 2 are schematic diagrams showing the principle itself of the invention.

Fig. 1 shows a possible outline of one of these strips or sheets. This strip is not necessarily straight; it is sufficient if it be continuous, that is, if the strip presents no interruption and moreover there not be any single point, such as, for example, sudden changes in direction. The length 3 of the air strip is greater than the corresponding dimension 4 of the sheet, in such a manner that it extends beyond the two edges of the sheet.

Figure 2:
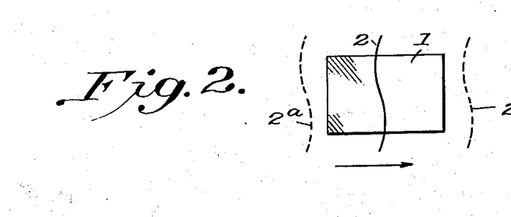

Fig. 2 indicates schematically the movement of the strip 2; it moves in such a manner that it is first completely beyond the sheet at 2ª, then it reaches the sheet and sweeps it completely, and finally it reaches a position 2ᵇ situated entirely beyond the opposite edge of the sheet. This movement can be either uniform, the speed being constant during the whole time that the strip sweeps the sheet, or it can be at a variable speed, but in the latter case without any sudden variations of the speed, without stopping, or without changing the direction while the strip passes over the sheet.

In the several different forms of execution which are to be described, the strips of cooling fluid are obtained by means of blowing slits which have been assumed rectilinear.

Figure 3:
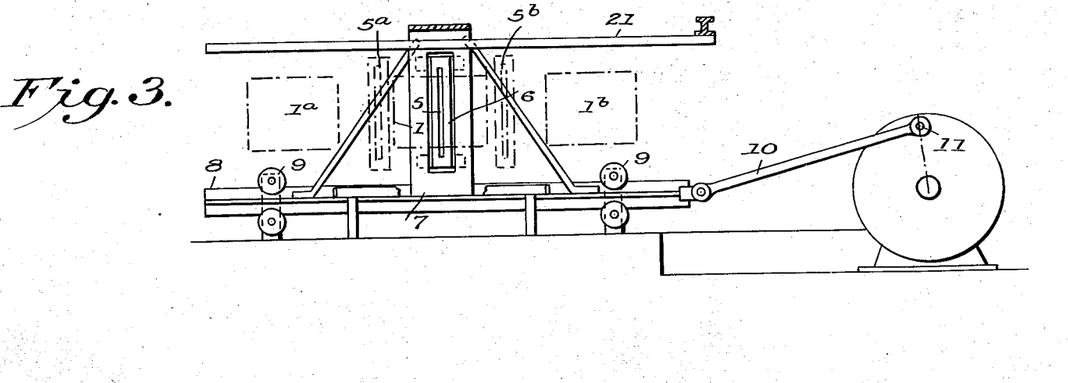
Fig. 3 is a view in diagrammatic elevation of the first arrangement.

In the arrangement illustrated in the assembly of Fig. 3, there is only one slit 5 for each face of the sheet. This slit forms part of a blowing box 6; fixed upon a movable carriage 7, mounted upon the movable rails 8, guided by the rollers 9, and it receives a reciprocating to-and-fro movement through the intermediary of a crank 10 and a crank pin 11. The radius of the circle described by this pin is large enough so that in the two extreme positions 5ª and 5ᵇ the slit is entirely beyond the sheet 1.

Figure 5:
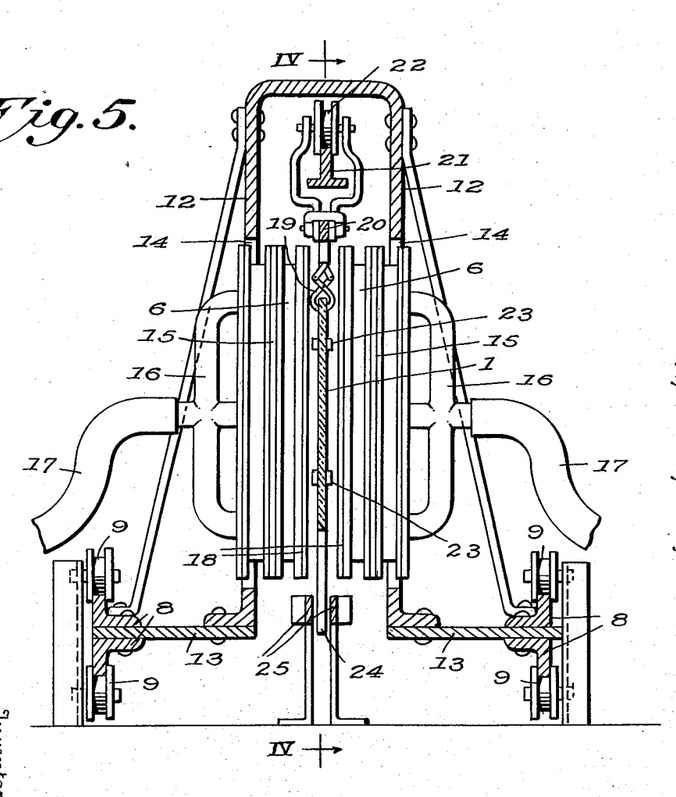
Figure 6:
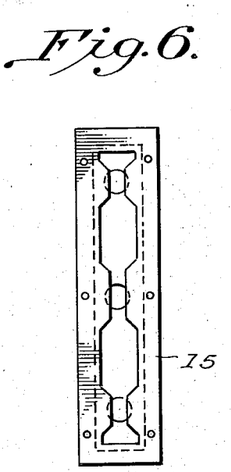

Upon each side of the sheet of glass 1 is disposed a like blowing box 6, in such a manner that the tempering is effected by simultaneous blowing upon the two faces. These two symmetrical boxes are carried by the carriage 7 represented in detail in Figs. 4 and 5. This carriage is formed by a bent sheet plate 12 extended by two plates 13 integral with rails 8. Windows 14 are disposed in the plate 12 in which are engaged and fixed the casings 6. These are formed by two coupled compartments between which is disposed a diaphragm 15, Figs. 5 and 6, which has for its aim to distribute as uniformly as possible the air brought in through the tubes 16, supplied thereto by conduit 17.

The edges of every one of the blowing slits are formed by two metallic plates 18 fixed to the casings 6, which may be removed when it is wished to replace these by other plates, for example, when it is desired to change the size of the slit, or when it is desired to trim by grinding the lips themselves of the plates.

The sheet of glass 1 is carried by the tongs 19 suspended from a horizontal bar 20 which rolls upon a rail 21 through the intermediary of rollers 22.

The above sheet is held laterally by the forks 23 integral with the posts 24 carried by the bar 20; these posts themselves are guided by the rails 25 when the sheet 1 is in the position where it must be cooled; thus all lateral displacement of the sheet during blowing is opposed.

In accordance with the dimensions of the sheet to be treated, the posts 24, etc., can be displaced upon the bar 20 and fixed in the desired position.

In order to temper a sheet after having heated it, it is brought into the position 1 of Fig 3, the blowing casing being at this time stationary at one of the extremities of its course and moreover not supplied with air or cooling fluid. When the sheet occupies the position 1, this supply is opened and then the movement of the crank 10 is started on its way. The strip of air or fluid produced by each of the slits 5 then effects a series of uninterrupted sweepings of the surface of the sheet. When the cooling is sufficient, the blowing is stopped, the sheet is brought to one of the positions 1ª or 1ᵇ and it is raised from the suspension frame formed by the bar 20 and the posts 24.

It is to be noted that the posts 24 which are in the plane of the sheet extend it and have the advantage of shielding the sheet from the action of eddies which are produced by the meeting of the two strips of air or fluid opposed to each other.

Figure 7:
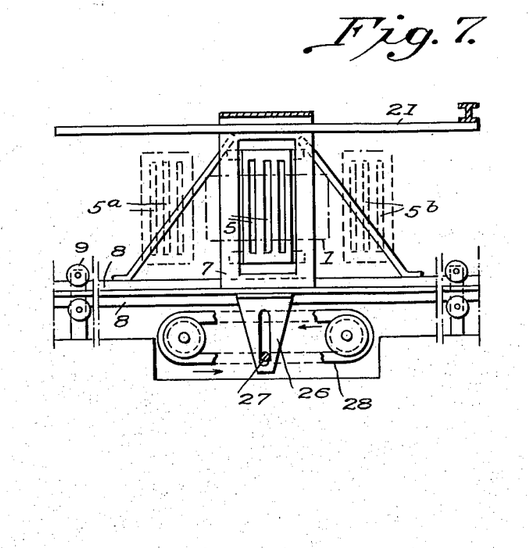
Fig. 7 is a view in elevation of a modification.

The reciprocating movement of the blowing casings, instead of being produced by a crank, can be obtained by a chain system or by an endless belt, similar to that of Fig. 7. In this arrangement the carriage 7 carries a vertical slide 26 in which is engaged a pin 27 integral with a chain or endless belt 28. The speed of displacement of the carriage is uniform during the whole time that the pin 27 does not reach the rollers over which the belt passes. Thus a reciprocating movement is attained during which the strip of air sweeps the sheet of glass at a constant speed. In this modification, several slits have been provided moreover upon each side of the sheet, which slits are attached to the same carriage 7 and to which is supplied simultaneously a cooling fluid.

In accordance with the invention, the course of the endless belt 28 is such, that at the extremities of this course, the assembly of the slits 5ª or 5ᵇ is entirely beyond the sheet 1.

Figure 8:
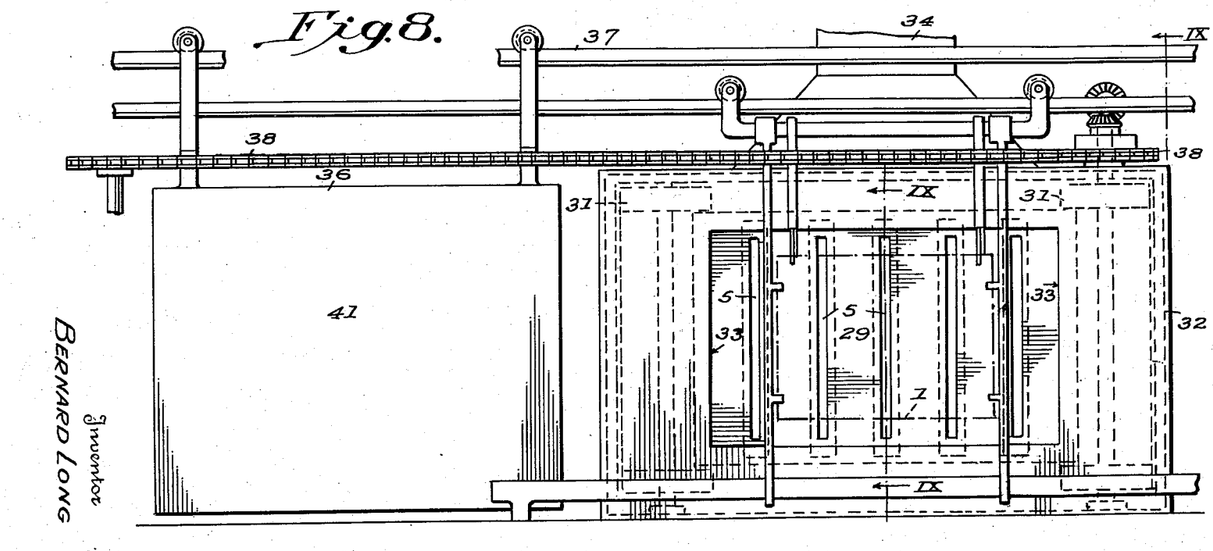
Fig. 8 is a view in elevation of another arrangement.
Figure 9:
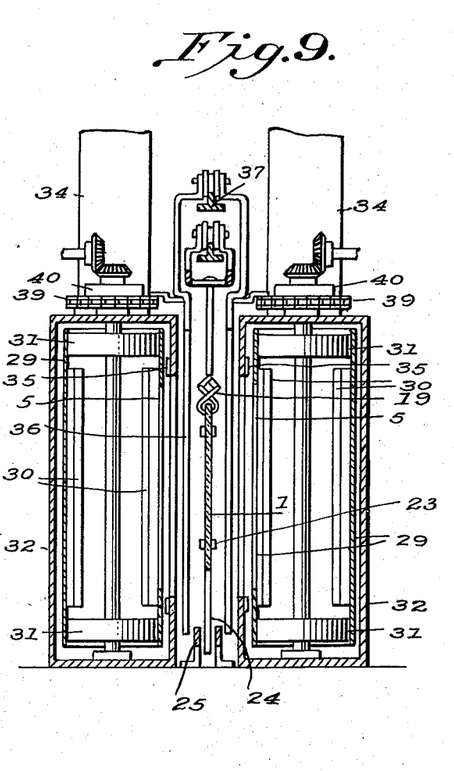
Fig. 9 is a view in section along the line IX—IX of Fig. 8.
Figure 10:
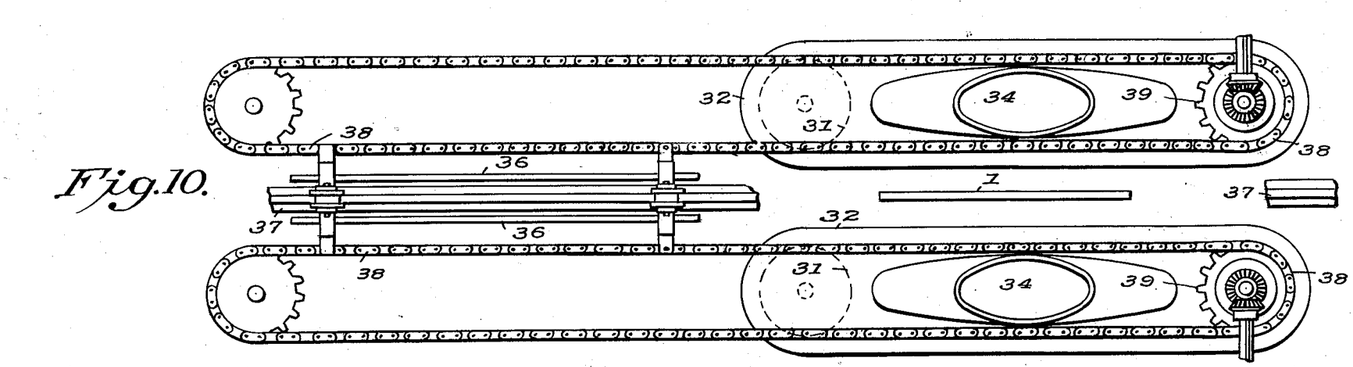
Fig. 10 is a plan view of the arrangement shown in Fig. 8.
Figure 11:
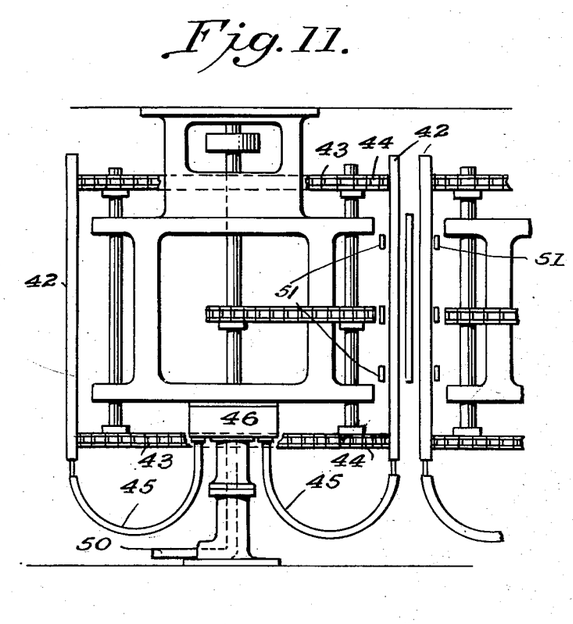
Fig. 11 is a view in elevation of another form of execution.
Figure 12:
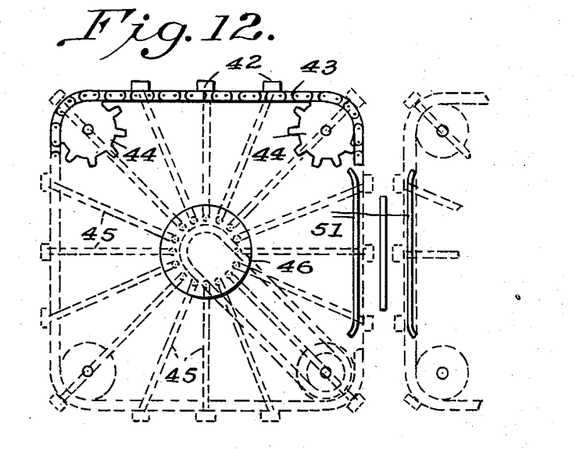
Fig. 12 is a plan view thereof.

Figs. 8, 9 and 10 relate to an arrangement in which the strips of the cooling fluid always move in the same direction, the movements of these strips being moreover repeatedly started off again at regular intervals. In the illustrated arrangement, a thin sheet 29, suitably stiffened by arms 30, moves in a continuous manner and at a constant speed while resting upon the drums or pulleys 31. In this sheet 29 are formed at equal intervals the blowing slits 5. The above sheet 29 is lodged in an air-tight box 32 presenting only one opening in the form of a window 33. This box is supplied with a fluid under pressure by a conduit 34. The sheet 29 rests against the edges of the window under the action of the internal pressure; the packings 35 disposed along the edges of this window assure a sufficiently tight hermetic joint. The window is of sufficiently large size so that the field of action of each strip, in accordance with the invention, is greater than the surface of the treated sheet 1.

The system is completed by a plane screen 36, movable upon a rail 37. This screen is designed to protect the sheet when it is put in place and serves to avoid certain slits from acting thereupon at the time that the sheet is brought into position 1 and before it has reached this position.

The screen is controlled by a chain 38 passing over a pulley 39 actuated by a clutch 40. A similar device is placed upon each side of the sheet, the two acting symmetrically upon the two sides.

Before treating a sheet, one begins by bringing the screen before the window. Then the sheet is brought to position 1. The mechanism for the movement of the slits is started on its way and a fluid under pressure is supplied thereto. At this time the screen protects the sheet from the blowing strips or sheets. Then the screen is placed in movement by means of the clutch 40. The diameters of the pulleys 39 and 31 have been chosen in such a manner that the chain 38 moves at the same speed as the sheet 29. The screen moves in the same direction and at the same speed as the blowing strips, and finally arrives in a stopping position 41 where it will remain until the end of the blowing. In this way one is sure that from the start of the cooling, that is, during the period most important from the viewpoint of the formation of iridescence, the action of each strip is spread out in a continuous manner from one extremity to the other of the sheet.

When the tempering is finished, the screen is brought back in front of the window. The sheet is disengaged from the space included between the two casings 32 and it is lifted from its carrying frame.

In the arrangement which has just been described, it is advisable that the cooling fluid which is supplied to the casings 32 be at a low pressure in order that the sheet 29 be made not to press too strongly against the edges of the window which would create a large resistance to the advancement of the sheet. In order to have an effective action, the slits should be made sufficiently large and they should be disposed at a slight spacing each from the other.

Figs. 11, 12, 13 and 14 illustrate a different form of execution, likewise allowing movable slits, the movement of which takes place always in the same direction and at a constant speed. But this modification permits the supplying of the slits with air at high pressure. In this modification hollow vertical bars 42 are entrained by endless chains 43 passing over pulleys 44. Each bar presents a slit turned towards the outside and is connected by a flexible conduit 45 to a distributor 46, formed by a casing which executes one complete revolution in the same time as the assembly of bars, and the base 47 of which presents orifices 48 at which all of the flexible conduits 45 terminate. A fixed horizontal disc 49 is in contact with the base, the disc being cut out along a sector, as may be seen in Fig. 14, in such a manner that only the bars of which the orifices 48 are uncovered receive the cooling fluid. Thus only the bars which are opposite or in proximity to the sheet can be supplied. The compressed air arrives into the distributor casing through a conduit 50. Appropriate transmission mechanism assures the synchronous rotations of the system of bars and of the distributor 46.

The guides 51 bear the reaction of the air against the bars in the blowing zone. The arrangement must be completed as in the case of Figs. 8, 9, 10, by a screen protecting the sheet until it is put in place; this is not illustrated in Figs. 11 and 12.

Another form of construction allowing the glass plate to be stationary and the slots to be always in movement in the same direction, is illustrated in Figs. 15 to 18. Here again the machine comprises hollow bars 52, with blowing slots, but they are arranged according to the radii of two rotary discs 53 carrying them. The discs rotate about a horizontal axis at right angles to the plane in which are placed the glass plates treated. The axis of rotation of these discs encounters the plane of the glass plate outside the latter.

Figure 13:
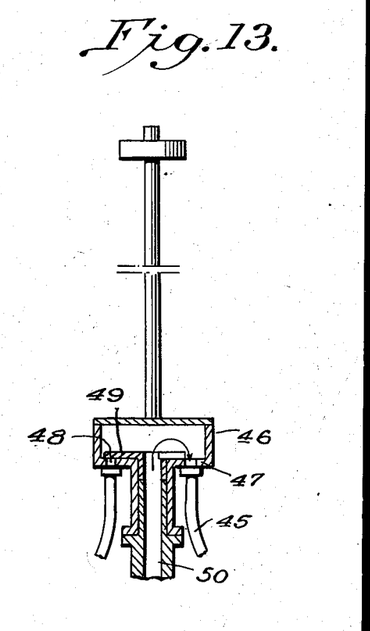
Fig. 13 is a vertical sectional view to a larger scale of a detail of this form of execution.
Figure 14:
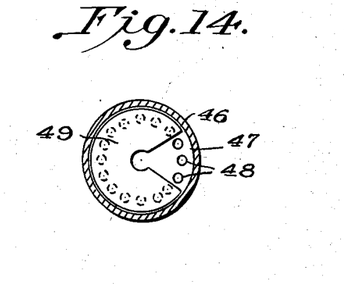
Fig. 14 is a horizontal sectional view corresponding to this detail.
Figure 17:
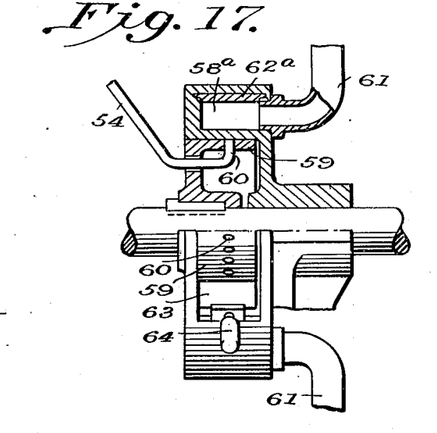
Figs. 17 and 18 are two detail views, on an enlarged scale, of the distributor of this system.
Figure 18:
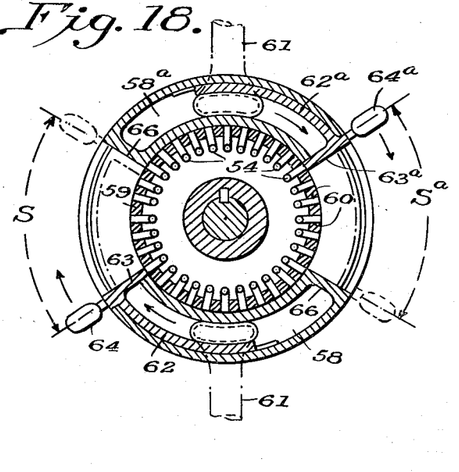

Each of the hollow bars is connected, by a tube 54, to corresponding distributors 55, which are shown in detail in Figs. 17 and 18, and the function of which, as in the case of the distributor 46 of Fig. 13, is to send the cooling fluid only in the bars which are in the zone opposite the glass plate.

Figure 15:
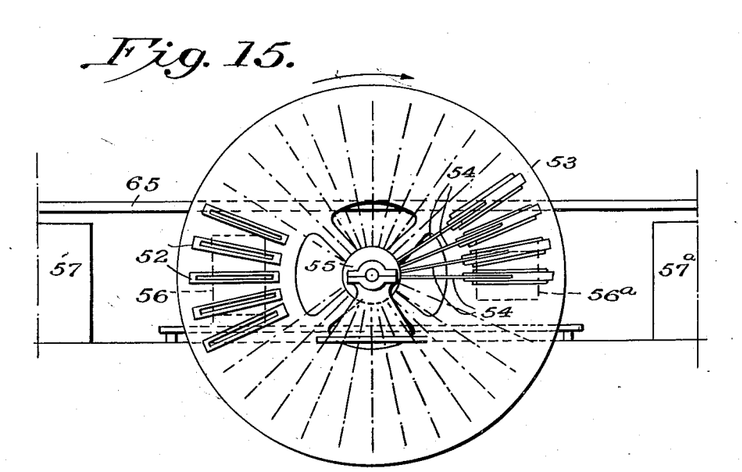
Fig. 15 is an elevation of another system.
Figure 16:
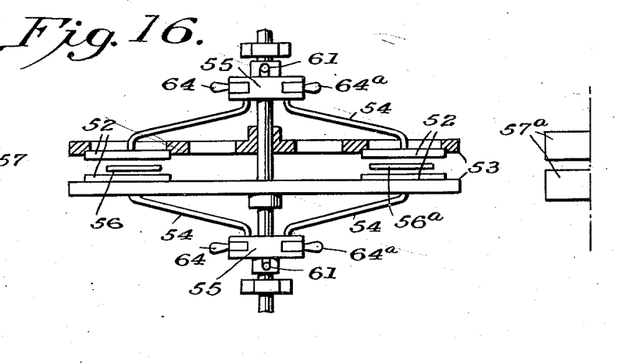
Fig. 16 is a corresponding plan view, partly in section.

This machine can treat the glass plates simultaneously and independently of each other in two positions 56, 56a, these glass plates coming from two furnaces 57, 57a arranged on either side of the machine.

Each distributor comprises two fixed chambers 58, 58a, each corresponding to one of the positions 56, 56a defined above. Between these chambers rotates a drum 59 perforated with orifices 60 to which lead the tubes 54. Conduits 61 lead air under pressure to said chambers.

Distributing shutters 62, 62a, having radial parts 63, 63a and provided with operating handles 64, 64a, can move along the walls of these chambers and allow either of closing them, or of putting them into communication with the portions of the drum 59, comprised in the sectors S and Sa, which are not covered by these chambers. The frames by which the glass plates are carried can roll on a rail 65.

The mode of utilisation of the machine is as follows: the discs are continuously allowed to rotate, the two distributors are closed, as shown by the positions in full lines of Fig. 18. Two heated glass plates can then be removed from the furnaces and moved to the positions 56, 56a.

The handles 64, 64a are then acted upon for causing the radial parts 63, 63a to move forward with the same speed as that of the movement of the orifices 60, for instance by means of friction driving devices, not shown, and momentarily rendering the shutters 62, 62a rigid with the drum 59. The radial parts 63, 63a therefore move forward in the direction of the arrow, and orifices 60 are placed in communication with the chambers 58, 58a.

The air sheets begin to sweep the glass plates 56, 56a. When the radial parts 63, 63a come in engagement with the fixed partitions 66, the shutters 62, 62a are stopped, position shown in dot and dash lines. As the connection was effected by friction, the rotary part 59 continues to rotate. The blowing continues during the necessary time, which may require several revolutions of the discs.

By moving the partitions 63, 63a at the speed of the orifices 60, the equivalent of a screen device similar to that described with reference to Figs. 8, 9 and 10 is obtained, that is to say some cooling sheets are prevented, at the beginning of the blowing from beginning to act whereas they are already placed opposite the glass plate.

When tempering is finished, the shutters 62 are restored to their initial position, this closing the distributors.

Instead of having a continuous movement, the discs 53 can receive a rocking movement and, in this case, they can be reduced to simple sectors. This arrangement similar to that of Figs. 3 and 7, has not been illustrated.

In all the arrangements which have just been described, the glass plate treated is stationary during treatment, and it is the blowing members which move.

The invention may be realized as well in a reversed manner, that is, by moving the sheet before fixed blowing elements.

Figures 4, 19, 20:
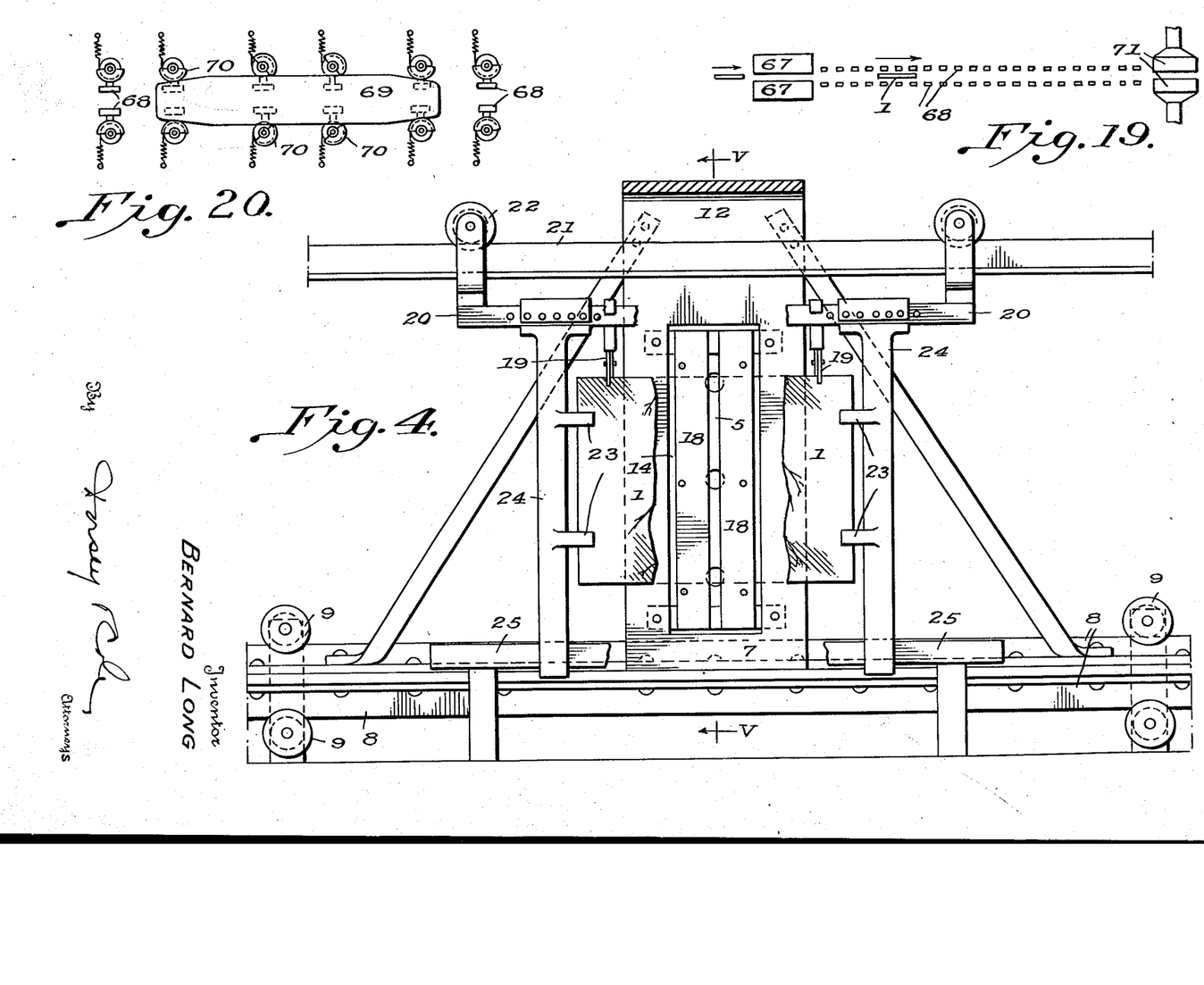
Figs. 4, 5 and 6 are detailed views, to a larger scale, in connection with the apparatus of Fig. 3, Fig. 4 being a vertical section along lines IV—IV of Fig. 5 and Fig. 5, a section along line V—V of Fig. 4.
Fig. 19 is a view in plan of another form of execution.
Fig. 20 shows a detail thereof.

Fig. 19 represents diagrammatically in plan a system of this class. The sheet 1 leaving an oven 67 passes between two series of hollow bars 68 having slits and supplied by a cooling fluid under pressure.

In order to avoid unnecessary expense of the fluid it is advisable to supply only those of the bars which are in active position in relation to the sheet. For this purpose it is possible to furnish the carriage carrying the sheet with an operating plate 69 (Fig. 20), acting upon cams 70 which open or close the cocks placed upon the pipes bringing the fluid to the bars 68.

In order to attain the complete cooling of the sheet with this apparatus it is necessary to have two extended rows of bars. However, if this be objectionable it can be avoided by effecting only the beginning of the tempering by the means characterizing the invention and by finishing it by means of appartaus 71 between which the sheet remains stationary. This apparatus of known type may consist simply of fixed jets of air effected by means of holes and without movement of the latter.

It is possible without departing from the principle of the invention to produce the strips of fluid by other means than by a simple blowing slit, particularly by suction instead of by blowing.

The strips or sheets of cooling fluid produced by blowing or suction in accordance with the preceding means or by entirely different processes are applicable to all possible methods of realization of the invention. Furthermore, it is apparent that in the same apparatus different forms of realization of the strips can be combined.

In all cases, in order to shield the edges of the glass sheet from eddys produced by the free meeting of the strips or sheets of air from opposite directions ahead and behind the glass sheet, it is preferable to dispose in advance of it in the plane thereof and beyond the sheet for extending it, guard bands, of a thickness approximately equal to that of the sheet, which perform a role analogous to that of posts 24 of Fig. 4. These bands must be as close as possible to the glass sheet.

The arrangements above are given only as exemplary; all the details of execution, the forms, dimensions and materials employed can be varied in all the cases without changing the principle of the invention.

What I claim is:

1. The method of tempering glass sheets or plates previously heated to the softening point which consists in applying to the opposite surfaces of the glass plate a continuous strip or sheet of cooling fluid covering the entire width of the glass plate and in effecting a relative movement between said glass plate and said cooling strip or sheet, so as to cause a continuous travel of the cooling strip or sheet upon the whole surface of the glass plate.

2. The method of tempering glass sheets or plates previously heated to the softening point which consists in applying to the opposite surfaces of the glass a continuous strip or sheet of cooling fluid, such strip or sheet projecting beyond any edge of the sheet, and effecting a relative movement between said glass plate and said cooling strip or sheet, so as to cause a continuous travel of the cooling strip or sheet upon the whole surface of the glass plate.

3. The method of tempering glass sheets or plates previously heated to the softening point which consists in applying to opposite surfaces of the glass plate a continuous strip or sheet of cooling fluid extending at least on the entire width of the glass plate effecting a relative movement between said glass plate and said cooling strip or sheet so as to cause a continuous travel of the cooling strip or sheet upon the whole surface of the glass plate, said cooling strip or sheet being present before and after contact with the glass plate.

4. The method of tempering glass sheets or plates previously heated to the softening point which consists in applying to the opposite surfaces of the glass plate a continuous strip or sheet of cooling fluid extending at least on the entire width of the glass plate and effecting a relative rectilinear movement between said glass plate and said cooling strip or sheet, so as to cause a continuous travel of the cooling strip or sheet upon the whole surface of the glass plate.

5. The method of tempering glass sheets or plates previously heated to the softening point which consists in maintaining the glass plate in a stationary position, applying to the opposite surfaces of the glass plate a continuous strip or sheet of cooling fluid extending at least on the entire width of the glass plate, and moving the cooling strip or sheet continuously across the whole surface of the glass plate.

6. A method of tempering glass sheets or plates previously heated to the softening point which consists in maintaining the glass plate in a stationary position, applying to the opposite surfaces of the glass plate a continuous strip or sheet of cooling fluid extending at least on the entire width of the glass plate and moving the cooling strip or sheet continuously in a rectilinear path across the whole surface of the glass plate.

7. The method of tempering glass sheets or plates previously heated to the softening point which consists in applying to the opposite surfaces of the glass plate continuous and successive sheets of cooling fluid extending at least on the entire width of the glass plate and effecting a relative movement between said glass plate and said cooling strip or sheet, so as to cause a continuous travel of the cooling strip or sheet upon the whole surface of the glass plate.

8. The method of tempering glass sheets or plates previously heated to the softening point which consists in applying to the opposite surface of the glass plate a continuous strip or sheet of cooling fluid extending at least on the entire width of the glass plate, effecting a relative movement between said glass plate and said cooling strip or sheet, so as to cause a continuous travel of the cooling strip or sheet upon the whole surface of the glass plate and shielding the glass plate from the strip or sheet of cooling fluid in advance of its application to the surface of the glass plate.

9. In apparatus for tempering glass sheets or plates, the combination of means for supporting a glass plate, a carriage, a blowing box located on said carriage on each side of the glass plate and provided with a continuous blowing slot extending at least on the entire width of the glass plate, means for admitting cooling fluid to said box and slot, and means for moving the glass plate and blowing slot relatively and to an extent sufficient to cause a continuous sheet of cooling fluid to traverse the whole surface of said glass plate.

10. In apparatus for tempering glass sheets or plates, the combination of means for supporting a glass plate, a carriage, a blowing box located on said carriage on each side of the glass plate and provided with a continuous blowing slot extending at least on the entire width of the glass plate, means for admitting cooling fluid to said box and slot, and means for moving the glass plate and blowing slot relatively in a rectilinear path and to an extent sufficient to cause a continuous strip or sheet of cooling fluid to traverse the whole surface of said glass plate.

11. In apparatus for tempering glass sheets or plates, the combination of means for supporting a glass plate, a carriage, a blowing box located on said carriage on each side of the glass plate and provided with a continuous blowing slot extending at least on the entire width of the glass plate, means for admitting cooling fluid to said box and slot, and means for moving the carriage and blowing boxes in a plane parallel to the plane of the glass plate and to an extent sufficient to move each of the blowing slots across the totality of the opposite surface of the glass plate.

12. In apparatus for tempering glass sheets or plates, the combination of means for supporting a glass plate, a carriage, a blowing box located on said carriage on each side of the glass plate and provided with a continuous blowing slot extending at least on the entire width of the glass plate, means for admitting cooling fluid to said box and slot, and means for moving the carriage and blowing boxes in a plane parallel to the plane of the glass plate and to an extent sufficient to move the blowing slots across the opposite surfaces of the glass plate, and beyond opposite edges thereof.

13. In apparatus for tempering glass sheets or plates, the combination of means for supporting a glass plate, a carriage, a blowing box located on said carriage on each side of the glass plate and provided with a continuous blowing slot of a width greater than the width of the glass plate, means for admitting cooling fluid to said box and slot, and means for moving the glass plate and blowing slot relatively and to an extent sufficient to cause a continuous sheet of cooling fluid to traverse the whole surface of said glass plate.

14. In apparatus for tempering glass sheets or plates, the combination of means for supporting a glass plate, a blowing box located on each side of the glass plate, a sheet movable in a closed path in each blowing box, said sheet constituting at least a part of one wall of each blowing box and being provided with a plurality of blowing slots extending at least on the entire width of the glass plate, means for driving the sheets to bring the slots in proximity to opposite surfaces of the glass plate, and means for admitting a cooling fluid to the blowing boxes and to the slots formed in the sheets.

15. In apparatus for tempering glass sheets or plates, the combination of means for supporting a glass plate, a blowing box located on each side of the glass plate, a sheet movable in a closed path in each blowing box, said sheet constituting at least a part of one wall of each blowing box and being provided with a plurality of blowing slots extending at least on the entire width of the glass plate, means for driving the sheets to bring the slots at times in proximity to opposite surfaces of the glass plate and at other times remote therefrom, means for sealing the slots when remote from the glass plate, and means for admitting a cooling fluid to the blowing boxes and to the slots formed in the sheets.

16. In apparatus for tempering glass sheets or plates, the combination of means for supporting a glass plate, a blowing box located on each side of the glass plate, a sheet movable in a closed path in each blowing box, said sheet constituting at least a part of one wall of each blowing box and being provided with a plurality of blowing slots extending at least on the entire width of the glass plate, means for driving the sheets to bring the slots in proximity to opposite surfaces of the glass plate, means for admitting a cooling fluid to the blowing boxes and to the slots formed in the sheets, and movable means for shielding the glass plate from the cooling fluid issuing from said slots when opposite to said plate.

17. In apparatus for tempering glass sheets or plates, the combination of means for supporting a glass plate, a blowing box located on each side of the glass plate, a sheet movable in a closed path in each blowing box, said sheet constituting at least a part of one wall of each blowing box and being provided with a plurality of blowing slots extending at least on the entire width of the glass plate, means for driving the sheets to bring the slots in proximity to opposite surfaces of the glass plate, means for admitting a cooling fluid to the blowing boxes and to the slots formed in the sheets, and means for shielding the glass plate in advance of the cooling fluid issuing from said slot when opposite to said plate.

18. In apparatus for tempering glass sheets or plates, the combintion of means for supporting a glass plate, a carriage, a blowing box located on said carriage on each side of the glass plate and provided with a continuous blowing slot of a width greater than the width of the glass plate, means for admitting cooling fluid to said box and slot, and means for moving the glass plate and blowing slot relatively to an extent sufficient to cause a continuous sheet of cooling fluid to traverse the surface of said glass plate and beyond opposite edges thereof.

19. In apparatus for tempering glass sheets or plates, the combination of means for supporting the glass plate, a blow box located adjacent the opposite sides of the glass plate, blowing pipes provided with continuous slots extending at least on the entire width of the glass plate connected to said blow box, means for moving the pipes in a closed path and in a direction so that at times said pipes are in proximity to said plate and at other times are remote therefrom, means for admitting a cooling fluid to said blow box and pipes, and valve means operable in conjunction with the blow box for admitting cooling fluid to only those pipes which are in proximity to the glass plate.

20. In apparatus for tempering glass sheets or plates, the combination of means for supporting the glass plate, a blow box located adjacent the opposite sides of glass plate, blowing pipes provided with continuous slots of a width greater than the width of the glass plate connected to said blow box and radiating therefrom, means for moving the pipes in a closed path about said blow box and in a direction so that at times said pipes are in proximity to said plate and at other times are remote therefrom, means for admitting a cooling fluid to said blow box and pipes, and valve means operable in conjunction with the blow box for admitting cooling fluid to only those pipes which are in proximity to the glass plate.

21. In apparatus for tempering glass sheets or plates, the combination of means for supporting the glass plate, a blow box located on opposite sides of the sheet and provided with a continuous blowing slot extending at least on the entire width of the plate, means for admitting cooling fluid to said blow box and slot, means for moving the glass plate and blowing slot relatively and to an extent that the cooling fluid issuing from the blowing slot will traverse opposite surfaces of the glass plate and extend beyond opposite edges thereof, and means located adjacent said opposite edges of the glass plate for shielding said edges from eddy currents due to the free meeting of the cooling fluid from opposite slots in advance of and to the rear of the plate.

22. In apparatus for tempering glass sheets or plates, the combination of means for supporting a glass plate, a blowing box located on each side of the glass plate and provided with a continuous blowing slot extending at least across one entire dimension of the glass plate, means for admitting cooling fluid to said box and slot, and means for moving the glass plate and blowing slot relatively and to an extent sufficient to cause a continuous sheet of cooling fluid to traverse the whole surface of said glass plate.

BERNARD LONG.